US012202280B2

(12) United States Patent
Shimoda et al.

(10) Patent No.: US 12,202,280 B2
(45) Date of Patent: Jan. 21, 2025

(54) PRINTER INCLUDING COVER MEMBER CONSTITUTING PART OF DISCHARGE SLOT AND ENGAGED WITH FRAME SUPPORTING PRINT HEAD

(71) Applicant: BROTHER KOGYO KABUSHIKI KAISHA, Nagoya (JP)

(72) Inventors: Koshiro Shimoda, Tokoname (JP); Masashi Tanizaki, Kuwana (JP); Yuya Nakamura, Toyoake (JP); Tetsuro Muramatsu, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 117 days.

(21) Appl. No.: 18/047,885

(22) Filed: Oct. 19, 2022

(65) Prior Publication Data

US 2023/0126655 A1 Apr. 27, 2023

(30) Foreign Application Priority Data

Oct. 25, 2021 (JP) ................................ 2021-173984

(51) Int. Cl.
*B41J 29/02* (2006.01)

(52) U.S. Cl.
CPC .................................... *B41J 29/02* (2013.01)

(58) Field of Classification Search
CPC ........................................................ B41J 29/02
See application file for complete search history.

(56) References Cited

U.S. PATENT DOCUMENTS

2014/0043422 A1 2/2014 Takahashi et al.
2017/0080723 A1* 3/2017 Nohara ...................... B41J 3/36
2018/0311978 A1* 11/2018 Ando ...................... B41J 11/04

FOREIGN PATENT DOCUMENTS

CN 101326062 A * 12/2008 .......... B41J 2/17513
JP 2011-251515 A 12/2011

* cited by examiner

*Primary Examiner* — Sharon Polk
(74) *Attorney, Agent, or Firm* — KENEALY VAIDYA LLP

(57) ABSTRACT

A printer includes: a print head; a support frame elongated in a first direction and supporting the print head; a discharge slot for discharging a medium after printing is performed on the medium; and a cover member covering the print head and the support frame. The discharge slot and the cover member are both elongated in the first direction. The cover member includes a surrounding part and a first engagement portion. The surrounding part surrounds an entirety of the discharge slot and has a peripheral portion extending in the first direction and constituting a part of the discharge slot. The first engagement portion is in engagement with a frame engagement portion of the support frame.

12 Claims, 10 Drawing Sheets

PRINTER INCLUDING COVER MEMBER CONSTITUTING PART OF DISCHARGE SLOT AND ENGAGED WITH FRAME SUPPORTING PRINT HEAD

REFERENCE TO RELATED APPLICATIONS

This application claims priority from Japanese Patent Application No. 2021-173984 filed on Oct. 25, 2021. The entire content of the priority application is incorporated herein by reference.

BACKGROUND ART

A conventional portable printer includes a chassis assembly and a housing assembled to each other. The chassis assembly supports a thermal line head configured to perform printing on a printing sheet.

The housing covers the chassis assembly from outside thereof to constitute an outer frame of the printer. The housing is made of resin and has, as a whole, a substantially rectangular parallelepiped shape which is elongated more in a left-right direction than in up-down and front-rear directions. The housing includes a top cover, a lower cover, and a cover member. The top cover has a substantially U-shape that is open toward the front in a plan view. The cover member is provided frontward of the top cover on a top surface thereof and is configured to open and close relative thereto. The lower cover has a substantially L-shape in a right side view. The top cover and the cover member constitute an upper portion of the outer frame of the printer. The top cover constitutes left and right end portions of the outer frame of the printer. The cover member and the lower cover constitute a front portion of the outer frame of the printer. The lower cover constitutes a bottom portion of the outer frame of the printer. In the front portion of the outer frame, a discharge port is formed between the cover member and the lower cover. After printing is performed on a printing sheet, the printed sheet is configured to be discharged out of the housing through the discharge port.

DESCRIPTION

In the above-described printer, the housing is elongated in the left-right direction. Conceivably, therefore, the top cover, lower cover, and cover member constituting the housing may be warped at the time of molding of these parts. In case that the cover member and the lower cover are warped, since the cover member and the lower cover function to provide the discharge port at front portion of the outer frame of the printer, a sheet discharging path along with a printed sheet is configured to be discharged through the discharge port may vary in position. As a consequence, wrinkles may be formed in the printed sheet.

In view of the foregoing, it is an object of the present disclosure to provide a printer capable of suppressing deviation in a discharge path of a printing medium.

In order to attain the above and other object, the present disclosure provides a printer including a print head, a support frame, a discharge slot, and a cover member. The print head is configured to perform printing on a medium. The support frame is elongated in a first direction and supporting the print head. The support frame includes a frame engagement portion. The discharge slot is elongated in the first direction. The medium is configured to be discharged through the discharge slot after the printing is performed on the medium by the print head. The cover member is elongated in the first direction and covers the print head and the support frame. The cover member includes a surrounding part and a first engagement portion. The surrounding part is elongated in the first direction and surrounds an entirety of the discharge slot. The surrounding part has a peripheral portion extending in the first direction and constituting a part of the discharge slot. The first engagement portion is engaged with the frame engagement portion.

In this printer, the surrounding part surrounds the entire periphery of the discharge slot. In the surrounding part, the peripheral portion extending in the first direction constitutes the part of the discharge slot and functions to regulate the position of the medium. Further, the cover member includes the first engagement portion in engagement with the frame engagement portion of the support frame. With this structure, rigidity of the cover member can be enhanced, so that the conveying path for the medium to be discharged through the discharge slot can be restrained from getting deviated.

OVERVIEW OF PRINTER 1

A printer 1 according to an embodiment of the present disclosure will be described with reference to accompanying drawings.

Figure 1:
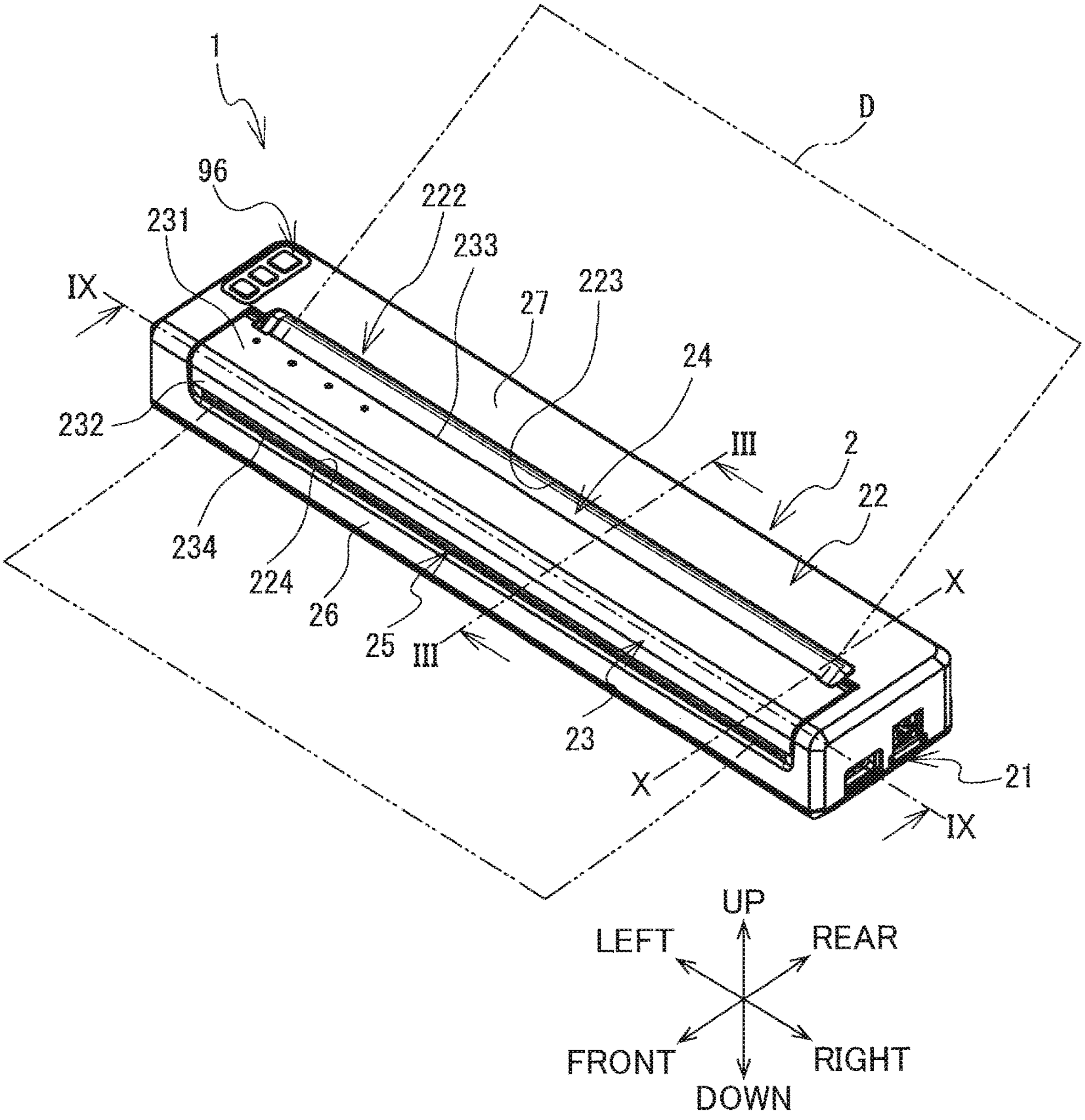
FIG. 1 is a perspective view of a printer 1 according to one embodiment.

In the following description, the lower-left side, upper-right side, upper-left side, lower-right side, upper side, and lower side in FIG. 1 will be defined as a front side, a rear side, a left side, a right side, an upper side, and a lower side of the printer 1, respectively.

The printer 1 is configured to form an image on a medium D based on print data. The medium D is not limited to a specific medium, and may be a sheet-like or tape-like medium. In the present embodiment, heat-sensitive cut paper is employed as the medium D.

Figure 2:
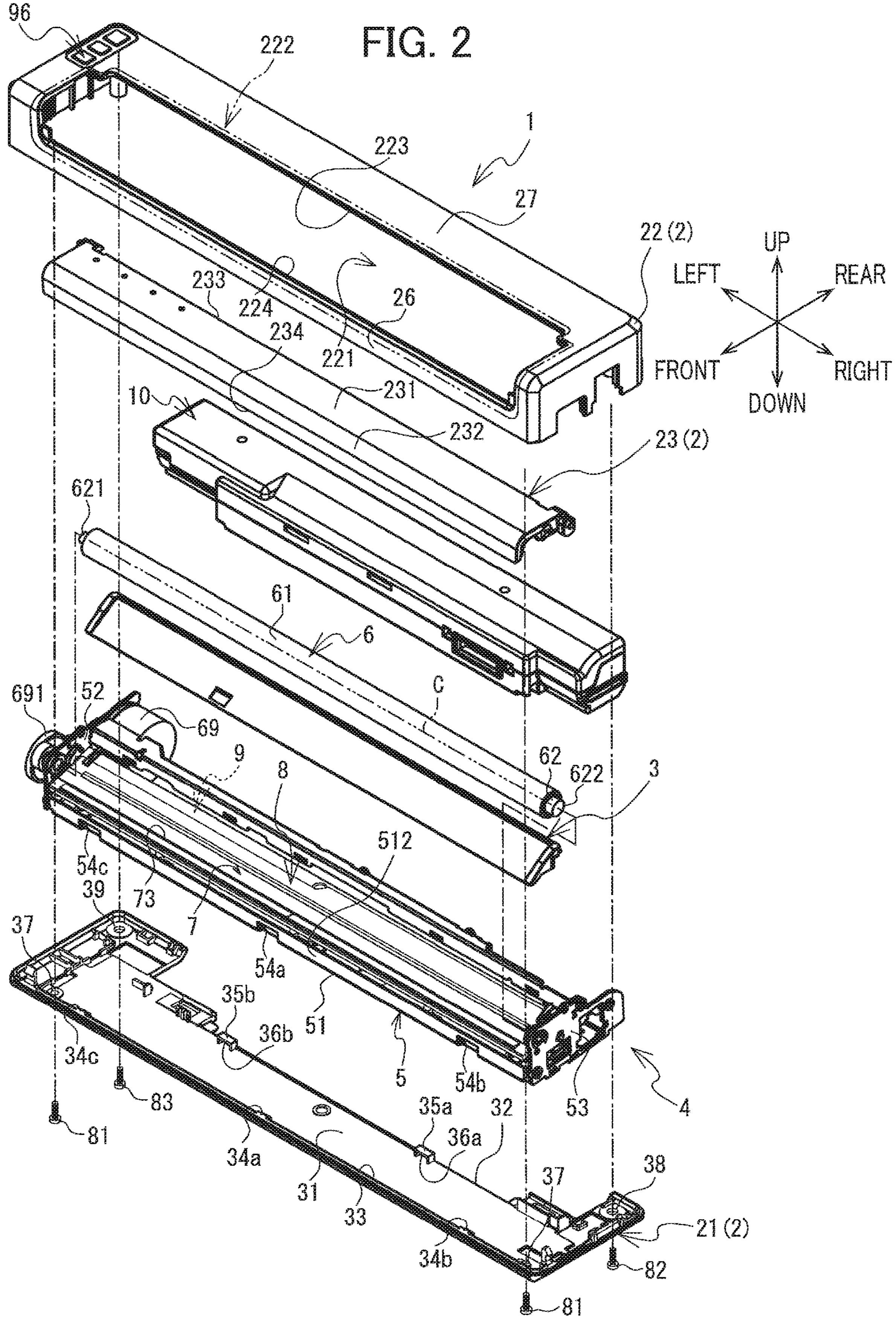
FIG. 2 is an exploded perspective view of the printer 1 as viewed from an upper-left side thereof.
Figure 3:
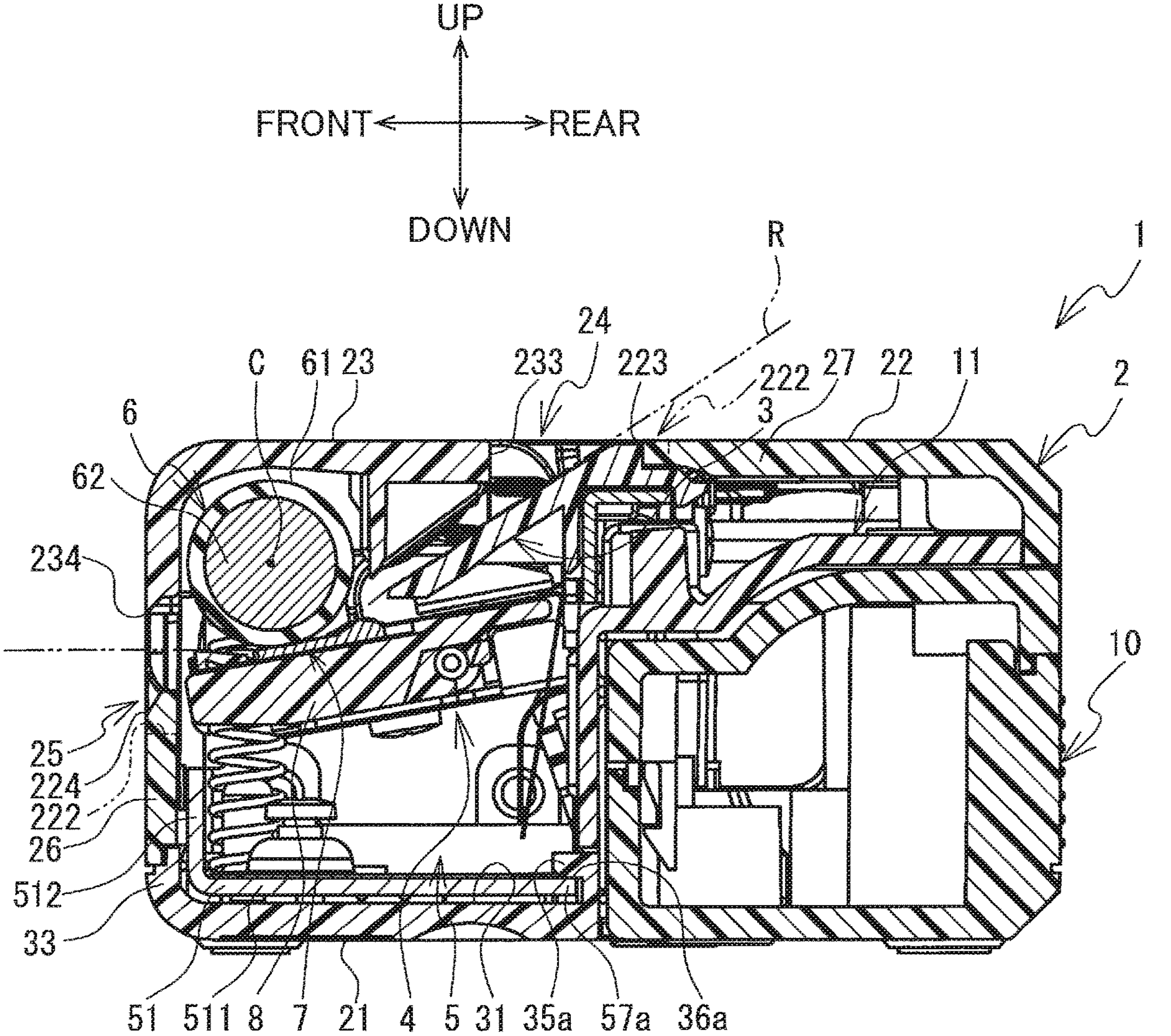
FIG. 3 is a cross-sectional view of the printer 1 taken along a line shown in FIG. 1.
Figure 4:
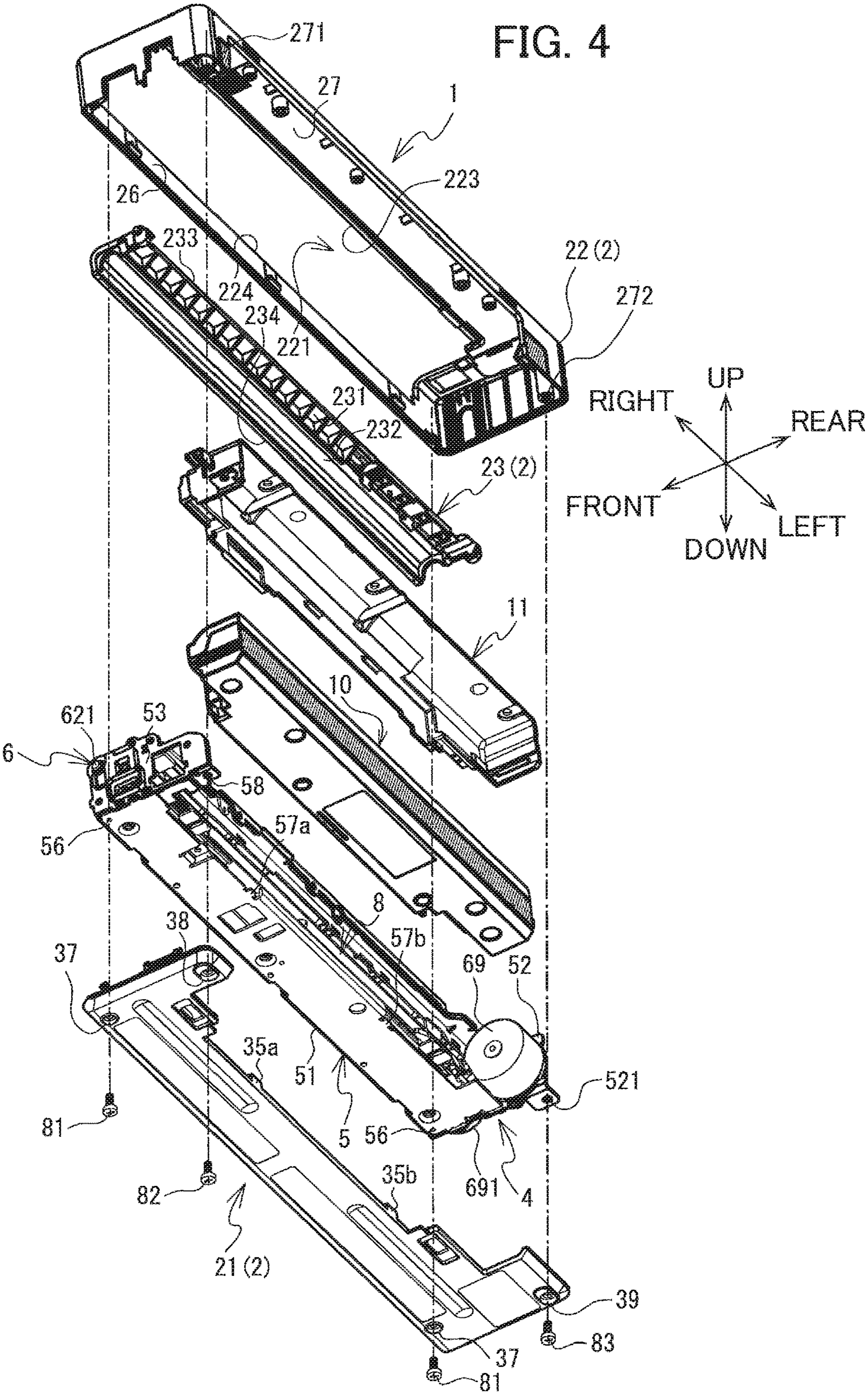
FIG. 4 is an exploded perspective view of the printer 1 as viewed from a lower-right side thereof.

The printer 1 includes a casing 2. The casing 2 has a rectangular parallelepiped shape whose dimension in a left-right direction is greater than dimensions thereof in a front-rear direction and an up-down direction. A battery 10 illustrated in FIGS. 2 to 4 is attachable to a lower-rear portion of the casing 2. The battery 10 is configured to supply power to the printer 1 when attached to the printer 1.

An input portion 96 is provided on an upper surface of the casing 2 in a region adjacent to a left end portion thereof. The input portion 96 includes a plurality of buttons configured to be depressed by a user.

As illustrated in FIGS. 2 and 3, the casing 2 includes a lower cover 21, an upper cover 22, and an open-close cover 23.

The lower cover 21 has a plate-like shape and extends in the front-rear direction and in the left-right direction. The lower cover 21 constitutes a bottom of the casing 2. The lower cover 21 will be described later in greater detail.

The upper cover 22 opens downward and is assembled to the lower cover 21 from above. The upper cover 22 is formed with an opening 221. The opening 221 is open on a front surface and an upper surface of the upper cover 22. Specifically, with respect to the up-down direction, the opening 221 extends from a center portion to an upper end of the front surface of the upper cover 22. With respect to the front-rear direction, the opening 221 extends from a front end to a center portion of the upper surface of the upper cover 22. Further, with respect to the left-right direction, the opening 221 extends from a position near a left end to a position near a right end of the upper cover 22.

Hereinafter, a peripheral portion of the upper cover 22 that surrounds an entire periphery of the opening 221 will be referred to as a "surrounding part 222". Further, in the surrounding part 222, an end defining a rear end of the opening 221 will be referred to as "opening edge 223", and an end defining a bottom end of the opening 221 will be referred to as "opening edge 224". The upper cover 22 will be described later in greater detail.

The open-close cover 23 is plate shaped and has a first portion 231 and a second portion 232. The first portion 231 extends in the front-rear direction and in the left-right direction. The second portion 232 extends downward from a front end of the first portion 231 and also extends in the left-right direction. The open-close cover 23 is configured to be fitted in the opening 221 of the upper cover 22. The first portion 231 has a rear end 223 that is rotatably supported by the surrounding part 222 of the upper cover 22. Accordingly, the open-close cover 23 is pivotable about the rear end 223 of the first portion 231 as a fulcrum, such that the open-close cover 23 can open and close the opening 221.

Hereinafter, the description will be made based on a state illustrated in FIG. 1 where the open-close cover 23 closes the opening 221. In the closed state of the open-close cover 23, the rear end 233 of the first portion 231 faces the opening edge 223 of the surrounding part 222 with a gap therebetween in the front-rear direction. Further, a lower end 234 of the second portion 232 faces the opening edge 224 of the surrounding part 222 with a gap therebetween in the up-down direction.

An insertion slot 24 is formed in an upper surface of the casing 2. The insertion slot 24 is an opening. The rear end 233 of the open-close cover 23 defines a front portion of the insertion slot 24. The opening edge 223 of the surrounding part 222 defines a rear portion of the insertion slot 24. That is, the insertion slot 24 is formed inside the opening 221. In other words, the surrounding part 222 surrounds (encloses) an entirety of the insertion slot 24. The medium D is configured to be supplied inside the casing 2 through the insertion slot 24.

A discharge slot 25 is formed in a front surface of the casing 2. The discharge slot 25 is an opening. The lower end 234 of the open-close cover 23 defines an upper portion of the discharge slot 25. The opening edge 224 of the surrounding part 222 defines a lower portion of the discharge slot 25. That is, the discharge slot 25 is formed inside the opening 221. In other words, the surrounding part 222 surrounds (encloses) an entirety of the discharge slot 25. After printing is performed on the medium D inside the casing 2, the medium D is configured to be discharged outside the casing 2 through the discharge slot 25.

As illustrated in FIGS. 2 and 3, the printer 1 includes a head unit 4 housed inside the casing 2. The head unit 4 includes a support frame 5, a platen roller 6, a thermal head 7, and a heat sink 8.

The support frame 5 includes a bottom plate 51, a left plate 52, and a right plate 53. The bottom plate 51 has a rectangular shape in a plan view and is elongated more in the left-right direction than in the front-rear direction. A detailed structure of the bottom plate 51 will be described later. The left plate 52 extends upward from a left end of the bottom plate 51 and also extends in the front-rear direction. The right plate 53 extends upward from a right end of the bottom plate 51 and also extends in the front-rear direction. The left plate 52 and right plate 53 oppose each other in the left-right direction.

The platen roller 6 is provided at an upper-front region inside the casing 2 (see FIG. 3). The platen roller 6 extends in the left-right direction. The platen roller 6 includes a cylinder part 61 and a shaft 62. The cylinder part 61 is an elastic body such as rubber. The shaft 62 penetrates through the cylinder part 61 and is fixed thereto. The shaft 62 has a left end 621 supported by the left plate 52. The shaft 62 has a right end 622 supported by the right plate 53. The platen roller 6 is thus rotatable about an axis C of the shaft 62.

The platen roller 6 is coupled to a motor 69 through a gear 691 and the like. The motor 69 is fixed to a right surface of the left plate 52 at a lower-rear portion thereof. The gear 691 is supported by the left plate 52 on a left side thereof. The platen roller 6 is rotatable upon receipt of a driving force of the motor 69 through the gear 691.

Referring to FIGS. 2 and 3, the axis C of shaft 62 serves as a rotation center C of the platen roller 6. The axis C (rotation center C) passes through a center of the shaft 62 and extends in the left-right direction. The platen roller 6 is rotatable about the rotation center C to convey the medium D in a conveying direction. The conveying direction is a direction in which the medium D is configured to be conveyed by the platen roller 6 and is orthogonal to the left-right direction in the present embodiment.

The thermal head 7 is disposed below the platen roller 6. As the medium D is conveyed by the rotation of the platen roller 6 in the conveying direction, the thermal head 7 moves relative to the medium D in the conveying direction. In the present embodiment, the conveying direction is a direction from the upper-rear toward the lower-front in FIG. 3. Accordingly, in FIG. 3, the upper-rear side corresponds to upstream in the conveying direction, while the lower-front side corresponds to downstream in the conveying direction.

As illustrated in FIG. 2, the thermal head 7 includes a plurality of heating elements 73. The plurality of heating elements 73 can generate heat when supplied with power. The plurality of heating elements 73 is configured to apply the generated heat to the medium D while making contact with the medium D which is pressed by the platen roller 6, thereby forming an image on the medium D.

The heat sink 8 is in contact with the thermal head 7 and supports the thermal head 7. The heat sink 8 has a plate-like shape and is configured to discharge the heat generated by the plurality of heating elements 73.

As illustrated in FIG. 4, a battery cover 11 is provided rearward of the head unit 4. The battery cover 11 has a box-like shape that is open downward and rearward. The battery cover 11 is configured to hold the battery 10 therein such that the battery 10 is detachable and attachable relative to the battery cover 11. The battery cover 11 has a left surface fixed to the left plate 52 of the head unit 4, and a right surface fixed to the right plate 53 of the head unit 4.

As illustrated in FIG. 3, a guide member 3 is provided upstream of the plurality of heating elements 73 of the thermal head 7 in the conveying direction. The guide member 3 is positioned inside the casing 2 at a position below the insertion slot 24. The guide member 3 has a plate-like shape and is elongated in the left-right direction. The guide member 3 extends diagonally downward and frontward from the opening edge 223 of the upper cover 22. The guide member 3 defines a conveying path R of the medium D conveyed in the conveying direction (see FIG. 3).

<Bottom Plate 51>

Figure 5:
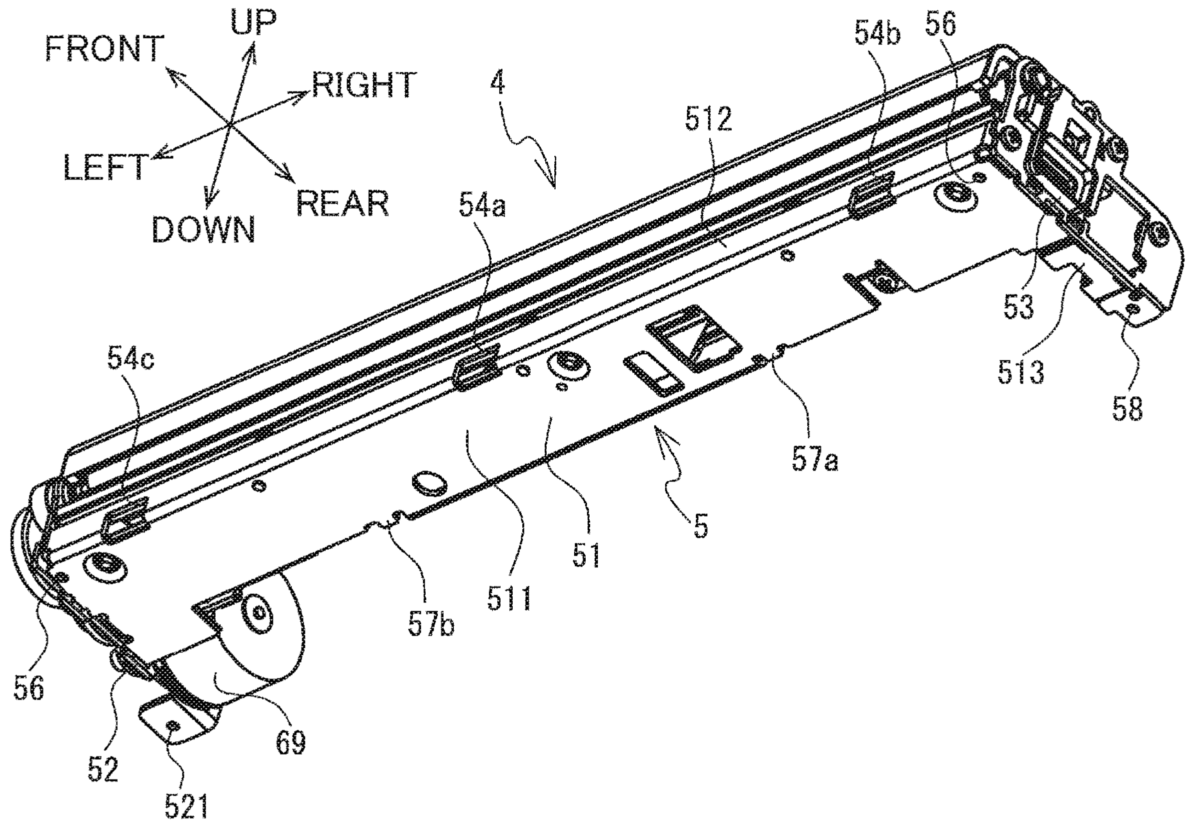
FIG. 5 is a perspective view of a head unit 4 of the printer 1.
Figure 6:
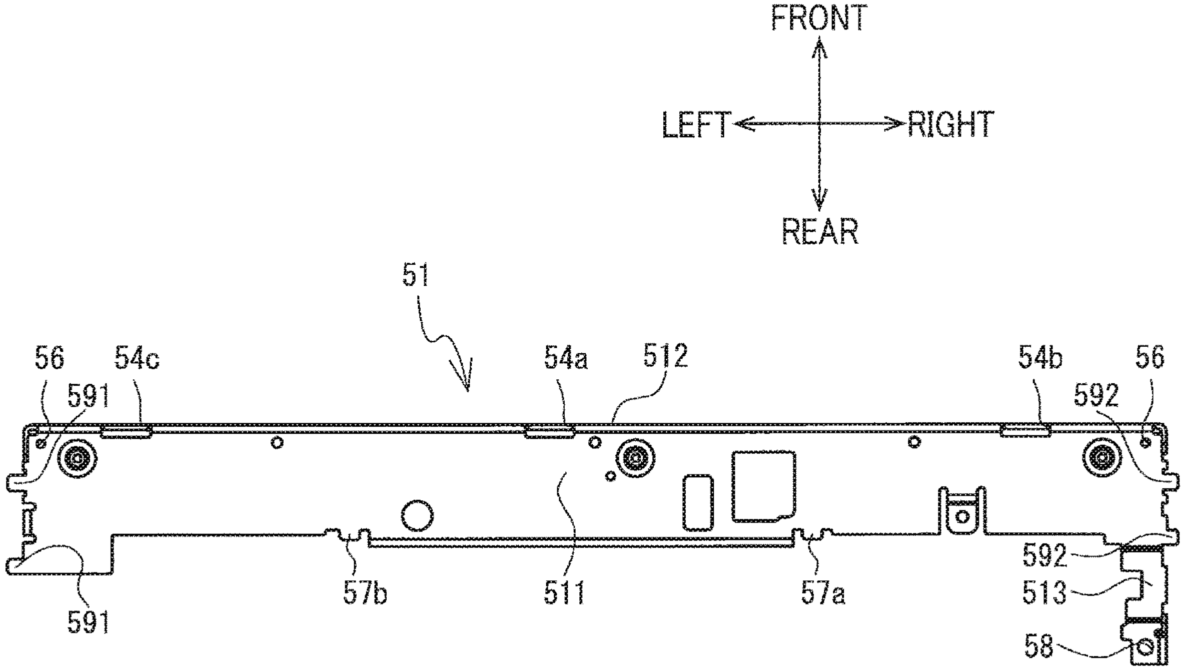
FIG. 6 is a bottom view of a bottom plate 51 of the head unit 4.

The bottom plate 51 will be described next with reference to FIGS. 5 and 6.

The bottom plate 51 is made of metal. The bottom plate 51 supports a controller 9 (see FIG. 2) configured to control operations of the printer 1 from below. The bottom plate 51 has a first plate part 511, a second plate part 512, and a third plate part 513.

The first plate part 511 has a rectangular plate-like shape elongated in the left-right direction in a plan view. The first plate part 511 has a rear end at which a tooth part 57*a* and a tooth part 57*b* are formed. The tooth part 57*a* is positioned slightly rightward of a center portion of the first plate part 511 in the left-right direction. The tooth part 57*b* is positioned slightly leftward of the center portion of the first plate part 511 in the left-right direction. Each of the tooth parts 57*a* and 57*b* are shaped as a protrusion protruding rearward from the rear end of the first plate part 511. Specifically, in the rear end of the first plate part 511, left and right regions adjacent to each tooth part 57*a*, 57*b* are recessed frontward such that a center portion interposed between the left and right regions constitutes each tooth part 57*a*, 57*b*. protruding rearward.

The first plate part 511 has a left end provided with two projections 591. The two projections 591 respectively protrude leftward from the left end of the first plate part 511. The two projections 591 are engaged with corresponding two holes (not illustrated) formed in the left plate 52. The first plate part 511 has a right end provided with two projections 592. The two projections 592 protrude rightward from the right end of the first plate part 511. The two projections 592 are engaged with corresponding two holes (not illustrated) of the right plate 53. The first plate part 511 is further formed with two holes 56. One of the holes 56 is at a front-right corner portion of the first plate part 511, while the other one of the holes 56 is at a front-left corner portion of the first plate part 511. A fastening member 81 (see FIG. 4) is inserted through each hole 56.

The second plate part 512 extends upward from a front end of the first plate part 511. The second plate part 512 has a rectangular plate-like shape elongated in the left-right direction in a front view. The second plate part 512 has a length in the left-right direction the same as a length in the left-right direction of the first plate part 511. Openings 54*a*, 54*b*, and 54*c* are formed each to span across the first plate part 511 and the second plate part 512. Specifically, the opening 54*a* is formed to span across the first and second plate parts 511 and 512 at center portions thereof in the left-right direction. The opening 54*b* is formed to span across the first and second plate parts 511 and 512 at right end portions thereof in the left-right direction. The opening 54*c* is formed to span across the first and second plate parts 511 and 512 at left end portions thereof in the left-right direction. That is, with respect to the left-right direction, the opening 54*a* is positioned between the opening 54*b* and opening 54*c*. The openings 54*a*, 54*b*, and 54*c* have the same shape as one another. With respect to the front-rear direction, each opening 54*a*, 54*b*, and 54*c* is open on a front end portion of the first plate part 511 and extends therefrom frontward to the front end of the first plate part 511. With respect to the up-down direction, each opening 54*a*, 54*b*, and 54*c* is open on a vertical center portion of the second plate part 512 and extends therefrom downward to the bottom end of the second plate part 512.

The opening 54*a* is positioned between the tooth part 57*a* and the tooth part 57*b* in the left-right direction. The opening 54*b* is positioned between the tooth part 57*a* and the hole 56 at the front-right corner portion of the first plate part 511 in the left-right direction. The opening 54*c* is positioned between the tooth part 57*b* and the hole 56 at the front-left corner portion of the first plate part 511 in the left-right direction.

The third plate part 513 extends rearward from a right end portion of the first plate part 511. The third plate part 513 has a rectangular plate-like shape elongated in the front-rear direction in a plan view. The front end of the first plate part 511 and a rear end of the third plate part 513 defines a length therebetween substantially the same as a length of each of the left and right plates 52 and 53 in the front-rear direction. The third plate part 513 has a rear end portion formed with a hole 58. A fastening member 82 (see FIG. 4) is inserted through the hole 58.

<Lower Cover 21>

Figure 7:
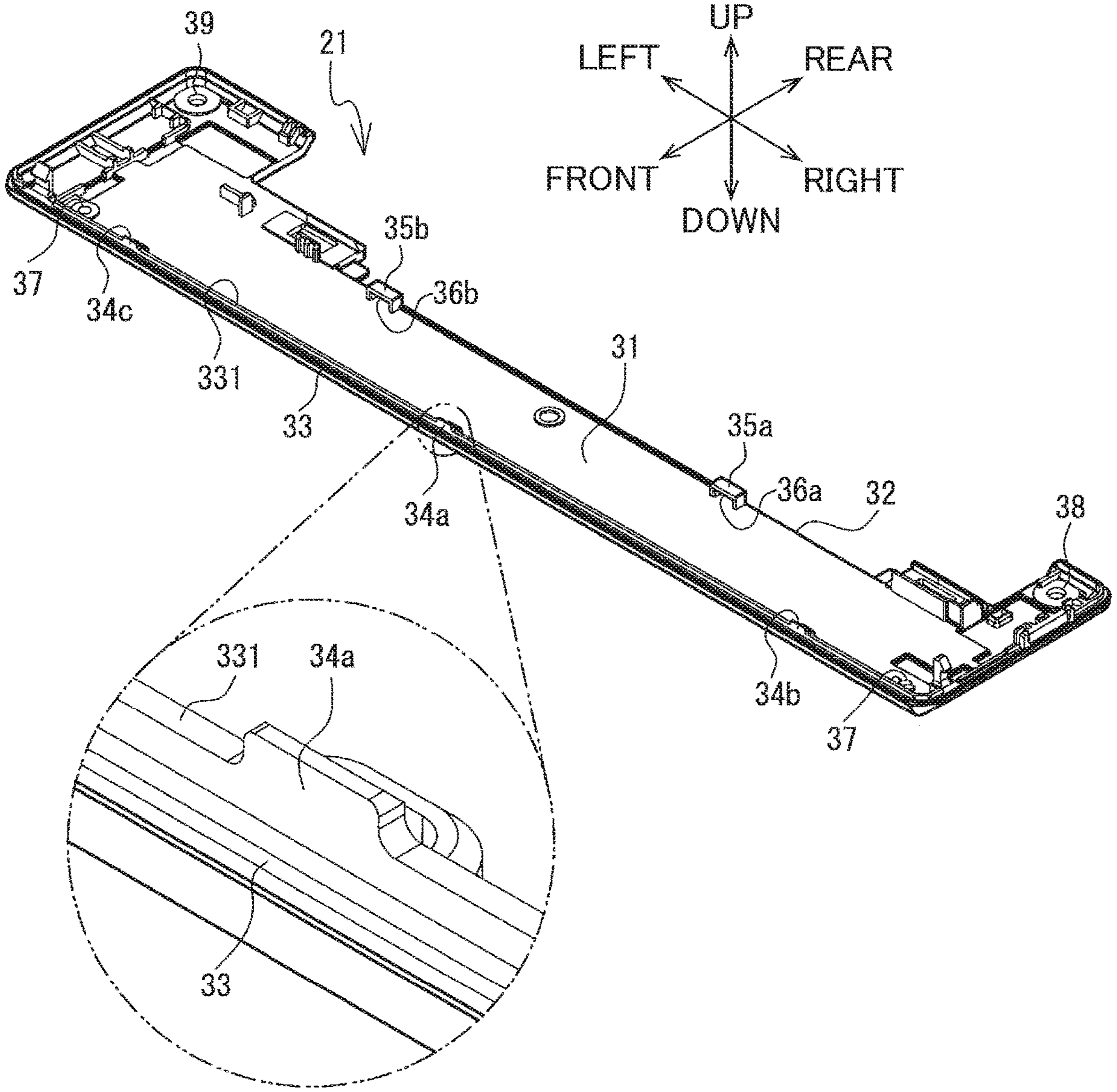
FIG. 7 is a perspective view of a lower cover 21.

The lower cover 21 is made of resin and is formed by injection molding. As illustrated in FIG. 7, the lower cover 21 has a plate part 31 and a front peripheral part 33.

The plate part 31 has a rectangular plate-like shape elongated in the left-right direction in a plan view. The plate part 31 has a recessed part 32, projecting parts 35*a* and 35*b*, and holes 37, 38, and 39. The plate part 31 has a rear end whose portion is recessed frontward to provide the recessed part 32. The recessed part 32 has a dimension in the left-right direction substantially the same as a dimension in the left-right direction of the battery cover 11. The recessed part 32 has a dimension in the front-rear direction substantially the same as a dimension in the front-rear direction of the battery cover 11.

The projecting parts 35*a* and 35*b* are provided frontward of the recessed part 32. With respect to a center portion of the plate part 31 in the left-right direction, the projecting part 35*a* is positioned slightly rightward of the center portion of the plate part 31, while the projecting part 35*b* is positioned slightly leftward of the center portion of the plate part 31. In the printer 1, the projecting part 35*a* is at a position corresponding to the tooth part 57*a*, and the projecting part 35*b* is at a position corresponding to the tooth part 57*b*.

Each projecting part 35*a*, 35*b* has a rectangular parallelepiped shape and protrudes upward from an upper surface of the plate part 31. The projecting part 35*a* has a recessed hole 36*a*. The recessed hole 36*a* is recessed rearward from a front surface of the projecting part 35*a*. The projecting part 35*b* has a recessed hole 36*b*. The recessed hole 36*b* is recessed rearward from a front surface of the projecting part 35*b*. In the printer 1, the recessed holes 36*a* and 36*b* are engaged with the tooth parts 57*a* and 57*b* of the bottom plate 51, respectively.

Two holes 37 are formed one each in front-right and front-left end portions of the plate part 31. The fastening member 81 is inserted through each hole 37. The hole 38 is formed in a rear-right end portion of the plate part 31. In the printer 1, the hole 38 is at a position corresponding to the hole 58 of the bottom plate 51. The fastening member 82 is inserted through the hole 38. The hole 39 is formed in a rear-left end portion of the plate part 31. In the printer 1, the hole 39 is at a position corresponding to a hole 521 (see FIG. 4) formed in a rear end portion of the left plate 52. A fastening member 83 (see FIG. 4) is inserted through the hole 39.

The front peripheral part 33 extends upward from a front end of the plate part 31. The front peripheral part 33 has a rectangular plate-like shape elongated in the left-right direction in a front view. The front peripheral part 33 has a length in the left-right direction the same as the length of the plate part 31 in the left-right direction. The front peripheral part 33 includes projections 34*a*, 34*b*, and 34*c*. The projection 34*a* is provided at a center portion of the front peripheral part 33 in the left-right direction. The projection 34*b* is provided at a right end portion of the front peripheral part 33 in the left-right direction. The projection 34*c* is provided at a left end portion of the front peripheral part 33 in the left-right direction. In the printer 1, the projections 34*a*, 34*b*, and 34*c* are at positions corresponding to the openings 54*a*, 54*b*, and 54*c* of the support frame 5, respectively. The projections 34*a*, 34*b*, and 34*c* protrude upward from an upper end 331 of the front peripheral part 33. The projections 34*a*, 34*b*, and 34*c* have the same shape as one another.

<Upper Cover 22>

Figure 8:
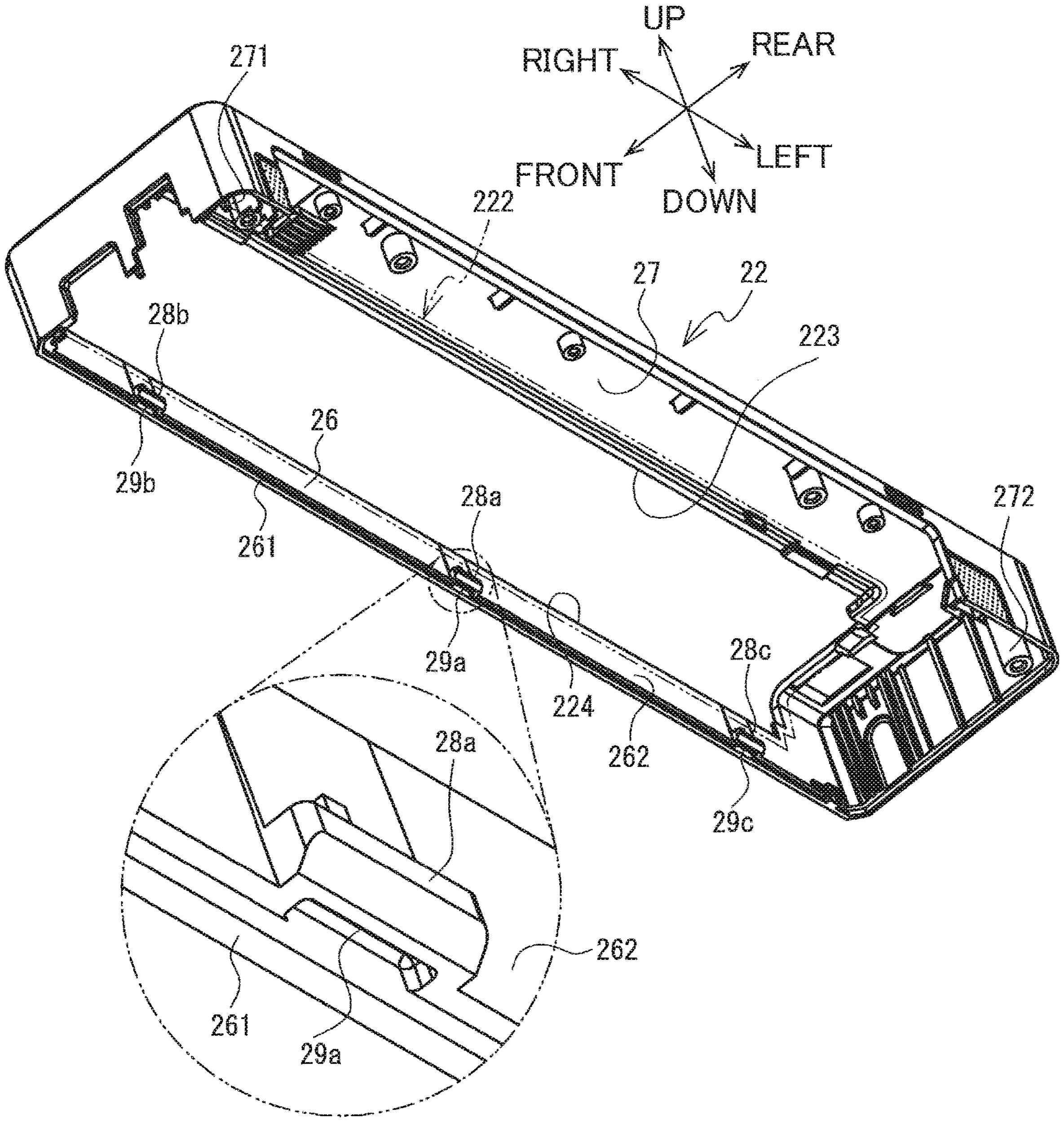
FIG. 8 is a perspective view of an upper cover 22.

The upper cover 22 is made of resin and is formed by injection molding. As illustrated in FIGS. 2 and 8, the upper cover 22 includes a front member 26 and an upper member 27. The front member 26 has a plate-like shape elongated in the left-right direction in a front view. The front member 26 has a front surface constituting the front surface of the upper cover 22. The front member 26 has an upper end that is recessed downward therefrom to provide the bottom and front ends of the surrounding part 222.

The front member 26 includes an outer plate 261, an inner plate 262, projections 28*a*, 28*b*, and 28*c*, and recessed holes 29*a*, 29*b*, and 29*c*. Each of the outer plate 261 and the inner plate 262 is a U-shaped plate-like member elongated in the left-right direction in a front view. The outer plate 261 is provided frontward of the inner plate 262. The outer plate 261 has a length in the up-down direction greater than a length in the up-down direction of the inner plate 262. The outer plate 261 has an upper end whose position in the up-down direction is substantially at the same as the position of an upper end of the inner plate 262 in the up-down direction. That is, the outer plate 261 has a lower end that is positioned below a lower end of the inner plate 262 in the up-down direction (see FIG. 8).

The projections 28*a*, 28*b*, and 28*c* are provided on a rear surface of the inner plate 262 at a lower end portion thereof. Specifically, the projection 28*a* is provided at a center portion of the front member 26 in the left-right direction. The projection 28*b* is provided at a right end portion of the front member 26 in the left-right direction. The projection 28*c* is provided at a left end portion of the front member 26 in the left-right direction. In the printer 1, the projections 28*a*, 28*b*, and 28*c* are at such positions corresponding to the openings 54*a*, 54*b*, and 54*c* of the bottom plate 51, respectively. Each of the projections 28*a*, 28*b*, and 28*c* protrudes rearward from the rear surface of the lower end portion of the inner plate 262. Each projection 28*a*, 28*b*, and 28*c* has a lower end at the same position as the lower end of the inner plate 262 in the up-down direction. The projections 28*a*, 28*b*, and 28*c* have the same shape as one another.

The recessed holes 29*a*, 29*b*, and 29*c* are formed to span across a bottom surface of the inner plate 262 and bottom surfaces of the respective projections 28*a*, 28*b*, and 28*c*. That is, the recessed holes 29*a*, 29*b*, and 29*c* are at the same positions as the projections 28*a*, 28*b*, and 28*c* in the left-right direction. In the printer 1, the recessed holes 29*a*, 29*b*, and 29*c* are at positions corresponding to the projections 34*a*, 34*b*, and 34*c* of the lower cover 21, respectively. Specifically, the recessed holes 29*a*, 29*b*, and 29*c* are recessed upward from the bottom surface of the inner plate 262 and from the bottom surfaces of the respective projections 28*a*, 28*b*, and 28*c*. Each recessed hole 29*a*, 29*b*, and 29*c* is open on the bottom surface of the inner plate 262 and the bottom surface of the corresponding projection 28*a*, 28*b*, and 28*c* to span from a front edge of the bottom surface of the inner plate 262 to a center portion of the bottom surface of the corresponding projection 28*a*, 28*b*, and 28*c* in the front-rear direction. The recessed holes 29*a*, 29*b*, and 29*c* have the same shape as one another.

The upper member 27 extends rearward from an upper end of the front member 26. The upper member 27 is a U-shaped plate-like member elongated in the left-right direction in a plan view. The upper member 27 has an upper surface constituting the upper surface of the upper cover 22. The upper member 27 has a front end that is recessed rearward therefrom to provide the upper and rear ends of the surrounding part 222.

The upper member 27 includes tubular portions 271 and 272. The tubular portion 271 extends downward from a lower surface of the upper member 27 at a rear-right corner portion thereof. The tubular portion 272 extends downward from the lower surface of the upper member 27 at a rear-left corner portion thereof. The tubular portions 271 and 272 each have a columnar shape whose axis extends in the up-down direction. Each of the tubular portions 271 and 272 has a length in the up-down direction substantially the same as a length in the up-down direction of the front member 26. Each tubular portion 271, 272 has a bottom surface in which a screw hole is formed to extend upward therefrom. The fastening members 82 and 83 (see FIG. 4) are screwed into the screw holes of the tubular portions 271 and 272, respectively.

<Engagement Among the Bottom Plate 51, Lower Cover 21, and Upper Cover 22>

Now, how the bottom plate 51, lower cover 21, and upper cover 22 are engaged with one another in the printer 1 will be described with reference to FIGS. 2 to 4, 9, and 10.

The bottom plate 51 is fixed to the head unit 4 in advance. The bottom plate 51 is disposed on the upper surface of the plate part 31 of the lower cover 21 such that the tooth parts 57*a* and 57*b* of the bottom plate 51 are engaged with the recessed holes 36*a* and 36*b* of the plate part 31, respectively (see FIG. 3).

Figure 9:
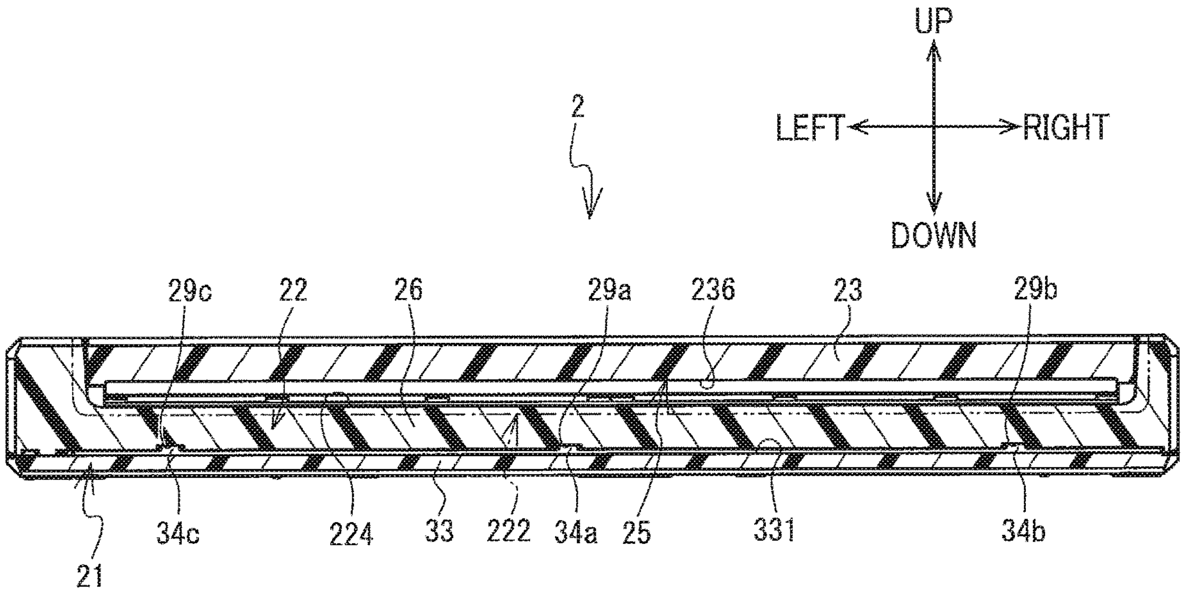
FIG. 9 is a cross-sectional view of the printer 1 taken along a line IX-IX shown in FIG. 1.

The upper cover 22 is then made to cover the lower cover 21 and the head unit 4 from above. As illustrated in FIG. 9, the projections 34*a*, 34*b*, and 34*c* of the lower cover 21 are engaged with the recessed holes 29*a*, 29*b*, and 29*c* of the upper cover 22, respectively. The engagement between the projections 34*a*, 34*b*, and 34*c* and the corresponding recessed holes 29*a*, 29*b*, and 29*c* can restrict deformation of the front member 26 of the upper cover 22 with respect to the front-rear direction and the left-right direction. In the printer 1, the upper end of each projection 34*a*, 34*b*, 34*c* is substantially at the same position as the upper end of corresponding recessed hole 29*a*, 29*b*, 29*c* in the up-down direction. In the printer 1, the upper end 331 of the front peripheral part 33 of the lower cover 21 is substantially at the same position as the lower end of the outer plate 261 of the upper cover 22 in the up-down direction.

Figure 10:
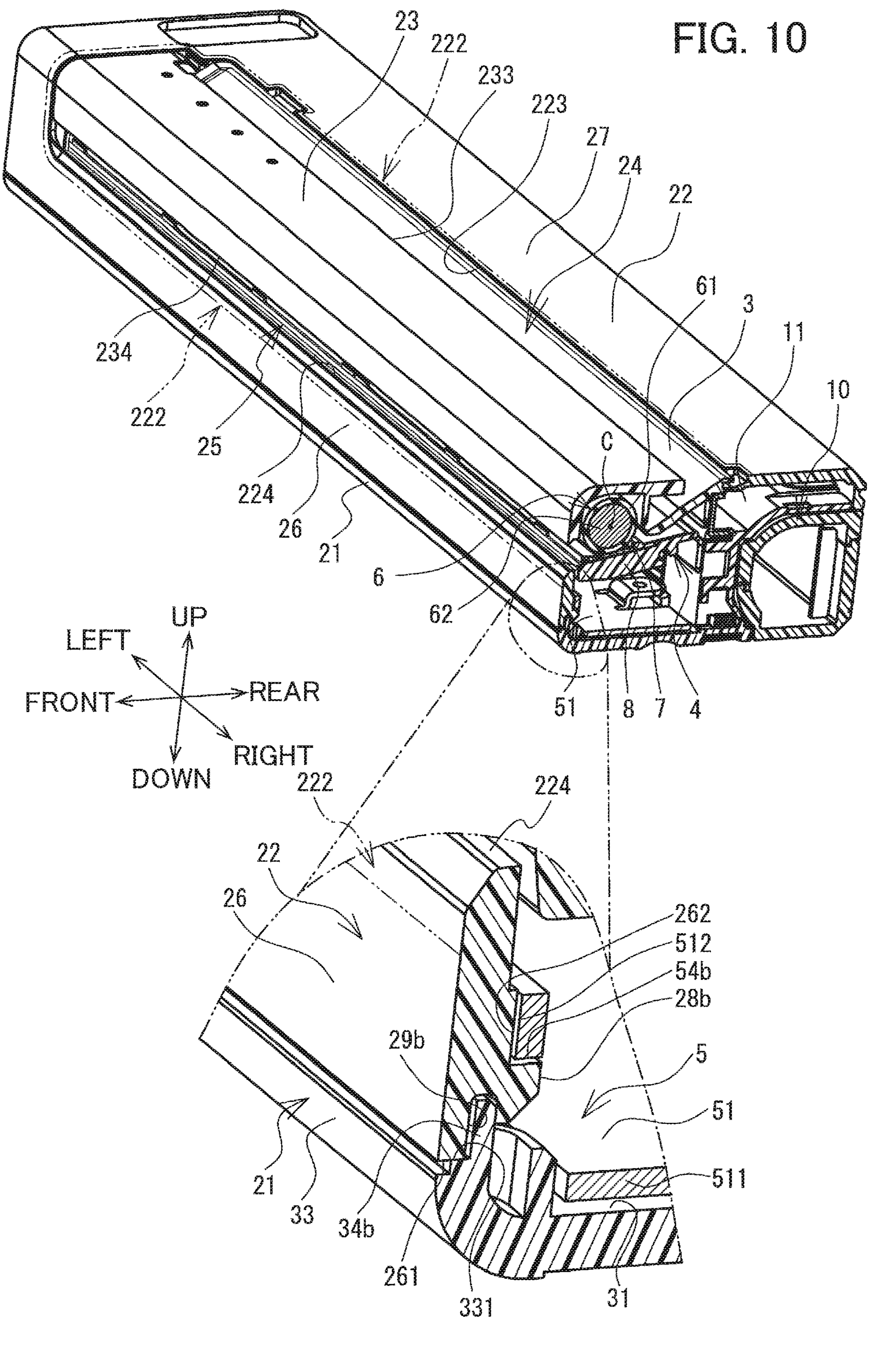
FIG. 10 is a cross-sectional view of the printer 1 taken along a line X-X shown in FIG. 1.

As illustrated in FIGS. 9 and 10, the projection 28*b* of the upper cover 22 is in engagement with (received in) the opening 54*b* of the bottom plate 51. Although not illustrated, the projections 28*a* and 28*c* of the upper cover 22 are respectively in engagement with (received in) the openings 54*a* and 54*c* of the bottom plate 51. The engagement between the projections 28*a*, 28*b*, 28*c* and openings 54*a*, 54*b*, 54*c* can restrict deformation of the front member 26 of the upper cover 22 in the up-down direction. In the printer 1, the upper end of each projection 28*a*, 28*b*, 28*c* is substantially at the same position as the upper end of corresponding opening 54*a*, 54*b*, 54*c* in the up-down direction. Further, in the printer 1, the rear end of the inner plate 262 of the upper cover 22 is substantially at the same position as the front end of the second plate part 512 of the bottom plate 51 in the front-rear direction.

As illustrated in FIGS. 2 and 4, the two fastening members 81 are inserted upward respectively through the corresponding holes 37 and holes 56 from below. After being inserted through the holes 37 and 56, the fastening members 81 are fastened to corresponding screw holes (not illustrated) formed in the head unit 4 above the bottom plate 51. The lower cover 21 and the head unit 4 are thus fixed to each other through the bottom plate 51.

Further, the fastening member 82 is inserted upward through the holes 38 and 58 from below. After being inserted through the holes 38 and 58, the fastening member 82 is screwed into the screw hole of the tubular portion 271 of the upper cover 22. The fastening member 83 is inserted upward through the holes 39 and 521 from below. After being inserted through the holes 39 and 521, the fastening member 83 is screwed into the screw hole of the tubular portion 272 of the upper cover 22. The lower cover 21, head unit 4, and upper cover 22 are thus fixed to one another.

Functions and Technical Advantages of the Embodiment

In the printer 1 according to the embodiment, the casing 2 has a rectangular parallelepiped shape elongated in the left-right direction. The discharge slot 25 is formed in the front surface of the casing 2. After printing is performed on the medium D, the medium D is configured to be discharged out of the casing 2 through the discharge slot 25. Specifically, the discharge slot 25 is formed within the opening 221 of the upper cover 22. In the upper cover 22, the opening 221 extends in the left-right direction from a position near the left end of the upper cover 22 to a position near the right end of the upper cover 22. The peripheral portion of the upper cover 22 defining the opening 221 is the surrounding part 222. The surrounding part 222 surrounds the entire periphery of the discharge slot 25 in the upper cover 22. The opening edge 224 of the surrounding part 222 constitutes the lower end of the discharge slot 25. The upper cover 22 includes the projections 28*a*, 28*b*, and 28*c*. The bottom plate 51 of the head unit 4 is formed with the openings 54*a*, 54*b*, and 54*c*. The bottom plate 51 has a rectangular shape in a plan view and is elongated more in the left-right direction than in the front-rear direction. The bottom plate 51 supports the thermal head 7 through the left plate 52 and right plate 53. In the printer 1, the projections 28*a*, 28*b*, and 28*c* are respectively in engagement with the openings 54*a*, 54*b*, and 54*c*. In the printer 1, the opening edge 224 of the surrounding part 222 that constitutes the lower end of the discharge slot 25 functions to regulate the position of the medium D on which printing has been performed. Since the casing 2 has a rectangular shape elongated in the left-right direction, the casing 2 is likely to deform with respect to a direction crossing the left-right direction. To this end, in the printer 1, the upper cover 22 is fitted with the bottom plate 51 through engagement of the projections 28*a*, 28*b*, and 28*c* of the front member 26 with the corresponding openings 54*a*, 54*b*, and 54*c* in the bottom plate 51. The upper cover 22 made of resin is thus engaged with the bottom plate 51 made of metal. With this structure, rigidity of the upper cover 22 (especially, rigidity of the front member 26) is enhanced so that the front member 26 having the opening edge 224 is less likely to be warped. This structure can suppress occurrence of a variation in the conveying path R for the medium D to be discharged through the discharge slot 25.

In the printer 1, the upper cover 22 integrally has the opening edge 224 that defines the lower end of the discharge slot 25, and there is no mating surface between the upper cover 22 and the lower cover 21 around the discharge slot 25. The printer 1 can thus have a better outer appearance around the discharge slot 25.

The lower cover 21 includes the projections 34*a*, 34*b*, and 34*c*. The upper cover 22 is formed with the recessed holes 29*a*, 29*b*, and 29*c*. In the printer 1, the projections 34*a*, 34*b*, and 34*c* are respectively in engagement with the recessed holes 29*a*, 29*b*, and 29*c*. The rigidity of the printer 1 is thus further enhanced by the engagement between the upper cover 22 and the lower cover 21, thereby further suppressing occurrence of a variation in the conveying path R of the medium D to be discharged through the discharge slot 25. Further, the upper cover 22 and the lower cover 21 are engaged with each other at front ends thereof, i.e., at the front side of the casing 2. With this structure, at the front end of the casing 2, the mating surface between the upper cover 22 and the lower cover 21 is hard to be displaced, and deterioration in the outer appearance of the printer 1 is less likely to occur.

In the upper cover 22, the projections 28*a*, 28*b*, and 28*c* are at the same positions as the recessed holes 29*a*, 29*b*, and 29*c*, respectively, in the left-right direction. With this structure, in the printer 1, the conveying path R for the medium D to be discharged from the discharge slot 25 can be restricted from getting varied through a simple configuration.

The lower cover 21 and the head unit 4 are fixed to each other by the fastening with the fastening members 81 and the engagement between the tooth parts 57*a*, 57*b* and the recessed holes 36*a*, 36*b*. Each fastening member 81 is inserted through the corresponding holes 37 and 56 and screwed into the corresponding screw hole of the head unit 4. The opening 54*a* is positioned between the tooth parts 57*a* and 57*b* in the left-right direction. The opening 54*b* is positioned between the tooth part 57*a* and the hole 56 at the front-right corner portion of the first plate part 511 in the left-right direction. The opening 54*c* is positioned between the tooth part 57*b* and the hole 56 at the front-left corner portion of the first plate part 511 in the left-right direction. In a case where an impact is imparted on the printer 1, stress concentrates on the openings 54*a*, 54*b*, and 54*c* of the bottom plate 51 that are engaged with the upper cover 22. In the printer 1, each of the openings 54*a*, 54*b*, and 54*c* is positioned, in the left-right direction, between portions at which the lower cover 21 and the head unit 4 are fixed to each other. With this structure, rigidity of the openings 54*a*, 54*b*, and 54*c* in the bottom plate 51 of the head unit 4 can be increased, thereby making the openings 54*a*, 54*b*, and 54*c* resistant to deformation upon application of impact on the printer 1.

The projection 28*a* is provided at the center portion of the front member 26 of the upper cover 22 in the left-right direction. That is, the projection 28*a* and the opening 54*a* are engaged with each other at the center portion of the printer

1 in the left-right direction. The printer 1 (casing 2) is elongated more in the left-right direction than in the front-rear and up-down directions. With respect to the left-right direction, the center portion of the upper cover 22 is more likely to be warped (deform) than both end portions thereof. In the printer 1, since the opening 54*a* and the projection 28*a* are engaged with each other at a center portion in the left-right direction in the printer 1, the conveying path R for the medium D to be discharged from the discharge slot 25 is likely to be maintained stable with less variation.

The projections 28*b* and 28*c* of the upper cover 22 are engaged with the openings 54*b* and 54*c* of the bottom plate 51 of the support frame 5, respectively. The opening 54*b* is formed to span across the first and second plate parts 511 and 512 at the right end portions thereof in the left-right direction. The opening 54*c* is formed to span across the first and second plate parts 511 and 512 at the left end portions thereof in the left-right direction. That is, the openings 54*b*, 54*c* and the corresponding projections 28*b*, 28*c* are engaged with each other to interpose the center portion in the printer 1 (where the opening 54*a* and the projection 28*a* are engaged with each other) therebetween in the left-right direction. With this structure, even in a case where impact is imparted on the printer 1, resultant stress does not concentrate on the opening 54*a*, and can also be applied to the openings 54*b* and 54*c* of the bottom plate 51 engaged with the upper cover 22.

Here, assume a comparative configuration where the bottom plate 51 has only the center opening 54*a* in the left-right direction. In this comparative configuration, the opening 54*a* may be deformed due to the concentration of the stress thereon in case of application of the impact to the printer 1. To this effect, in the present embodiment, the bottom plate 51 is fixed to the upper cover 22 not only at the center portion of the printer 1 in the left-right direction by the engagement between the opening 54*a* and the projection 28*a*, but also at positions sandwiching the center portion of the printer 1 therebetween in the left-right direction (i.e., at the left and right end portions of the printer 1) by the engagement between the openings 54*b*, 54*c* and the corresponding projections 28*b*, 28*c*. Thus, the stress applied to the bottom plate 51 does not concentrate on the opening 54*a*, but can be distributed among the openings 54*a*, 54*b* and 54*c*. In this way, deformation of the openings 54*a*, 54*b*, and 54*c* is hard to occur even when impact is applied to the printer 1.

The upper cover 22 and the lower cover 21 are fixed to each other at respective rear end portions by screwing the fastening members 82 and 83 into the screw holes of the respective tubular portions 271 and 272. With this structure, misalignment of the mating surface between the upper and lower covers 22 and 21 at the rear side of the casing 2 is less likely to occur, and, hence, deterioration in the outer appearance of the printer 1 is also less likely.

Among the upper cover 22, head unit 4, and lower cover 21, the head unit 4 including the metal bottom plate 51 has highest rigidity, followed by the upper cover 22 that is engaged with the bottom plate 51 and the lower cover 21. Even with regard to the lower cover 21 having relatively lower rigidity than the upper cover 22 and the head unit 4, the lower cover 21 is fitted to the bottom plate 51 by the fastening with the fastening members 81 and the engagement of the recessed holes 36*a*, 36*b* with the respective tooth parts 57*a*, 57*b*. As such, the warpage of the lower cover 21, if any, is reduced to a low level. Such reduction in the amount of warpage of the lower cover 21 can lead to reduction in stress to be generated in the lower cover 21 at the time of fitting of the lower cover 21 to the bottom plate 51. Further, since the lower cover 21 is a member constituting the lower surface of the casing 2, lower level of warpage of the lower cover 21 can have little adverse influence on the outer appearance of the printer 1.

Modifications

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

The engagement between the upper cover 22 and the bottom plate 51 may be realized through configurations other than the described configuration of the embodiment. For example, the upper cover 22 may have recesses in place of the projections 28*a*, 28*b*, and 28*c*, while the bottom plate 51 may have projections engageable with the recesses of the upper cover 22 in place of the openings 54*a*, 54*b*, and 54*c*.

Likewise, the engagement between the upper cover 22 and the lower cover 21 may also be realized through configurations other than the described configuration of the embodiment. For example, the upper cover 22 may have projections in place of the recessed holes 29*a*, 29*b*, and 29*c*, while the lower cover 21 may have recesses engageable with the projections of the upper cover 22 in place of the projections 34*a*, 34*b*, and 34*c*.

Still further, the engagement between the lower cover 21 and the bottom plate 51 may also be realized through configurations other than the described configuration of the embodiment. For example, the lower cover 21 may have projections in place of the recessed holes 36*a* and 36*b*, while the bottom plate 51 may have notches engageable with the projections of the lower cover 21 in place of the tooth parts 57*a* and 57*b*.

The engagement of the upper cover 22 with the bottom plate 51 can be made at arbitrary positions on the upper cover 22, as long as the engagement position is at the front member 26 of the upper cover 22. For example, the projections 28*b* and 28*c* may be provided at the center portion of the front member 26 in the left-right direction, just like the projection 28*a*. Alternatively, the projection 28*a* may be provided at a position other than the center portion of the front member 26 in the left-right direction. Still alternatively, the projections 28*a*, 28*b*, and 28*c* need not be at the same positions as the respective recessed holes 29*a*, 29*b*, and 29*c* in the left-right direction. Further, the upper cover 22 may be engaged with the left plate 52 or the right plate 53 of the head unit 4, rather than with the bottom plate 51.

The position at which the lower cover 21 is engaged with the upper cover 22 need not be sandwiched between those portions at which the lower cover 21 and the head unit 4 are fixed to each other in the left-right direction.

The position at which the bottom plate 51 is engaged with the lower cover 21 need not be limited to that described in the above embodiment. For example, the front end portion of the bottom plate 51 may be engaged with the front peripheral part 33 of the lower cover 21.

The number of positions at which the upper cover 22 is engaged with the bottom plate 51 need not be limited to three, but may be one or more than two. Further, the number of positions at which the upper cover 22 and the bottom plate 51 are engaged with each other need not be equal to the number of positions at which the upper cover 22 and the lower cover 21 are engaged with each other. For example, the upper cover 22 and the bottom plate 51 may be engaged with each other at three positions, while the upper cover 11 and the lower cover 21 may be engaged with each other at two positions.

Remarks

The printer 1 is an example of a printer. The thermal head 7 is an example of a print head. The support frame 5 is an example of a support frame. The openings 54*a*, 54*b*, 54*c* are an example of a frame engagement portion of the support frame. The discharge slot 25 is an example of a discharge slot. The upper cover 22 is an example of a cover member. The surrounding part 222 is an example of a surrounding part. The opening edge 224 of the surrounding part 222 is an example of a peripheral portion of the surrounding part. The projections 28*a*, 28*b*, 28*c* are examples of a first engagement portion. The projection 28*a* is also an example of a first engagement part. The projection 28*b* is also an example of a second engagement part. The projection 28*c* is also an example of a third engagement part. The lower cover 21 is an example of a second cover member. The projections 34*a*, 34*b*, 34*c* are examples of a second-cover engagement portion. The recessed holes 29*a*, 29*b*, 29*c* are examples of a second engagement portion of the cover member. The recessed holes 36*a*, 36*b* are examples of a plurality of fixing portions of the second cover member. The open-close cover 23 is an example of a third cover member. The lower end 234 of the open-close cover 23 is an example of a peripheral portion of the third cover member. The left-right direction is an example of a first direction.

What is claimed is:

1. A printer comprising:

a print head configured to perform printing on a medium;

a support frame elongated in a first direction and supporting the print head, the support frame comprising a frame engagement portion;

a discharge slot elongated in the first direction, the medium being configured to be discharged through the discharge slot after the printing is performed on the medium by the print head; and a cover member elongated in the first direction and covering the print head and the support frame, the cover member comprising:

a surrounding part elongated in the first direction and surrounding an entirety of the discharge slot, the surrounding part having a peripheral portion extending in the first direction and constituting a part of the discharge slot; and a first engagement portion engaged with the frame engagement portion, wherein the cover member comprises a first portion and a second portion, wherein the surrounding part is constituted by the first portion and the second portion, and wherein the first engagement portion is provided at the first portion.

2. The printer according to claim 1, further comprising a second cover member covering the support frame in cooperation with the cover member, the second cover member comprising a second-cover engagement portion, wherein the cover member further comprises a second engagement portion engageable with the second-cover engagement portion.

3. The printer according to claim 2, wherein the first engagement portion and the second engagement portion are at the same position as each other in the first direction.

4. The printer according to claim 2, wherein the second cover member comprises a first fixing portion and a second fixing portion through which the support frame is fixed to the second cover member, and wherein the first engagement portion is positioned between the first fixing portion and the second fixing portion with respect to the first direction.

5. The printer according to claim 2, wherein the second cover member is screw-fixed to the support frame with a first fastening member and a second fastening member, and wherein the second cover member is also screw-fixed to the cover member with a third fastening member and a fourth fastening member.

6. The printer according to claim 1, wherein the first engagement portion is in engagement with the frame engagement portion at a position corresponding to a center region of the printer in the first direction.

7. The printer according to claim 6, wherein the first engagement portion comprises a first engagement part, a second engagement part and a third engagement part, the first engagement part being positioned at the center region of the printer in the first direction and being interposed between the second engagement part and the third engagement part in the first direction.

8. The printer according to claim 1, wherein the first engagement portion is a projection protruding in a direction crossing the first direction, and wherein the frame engagement portion is a recess in which the projection is received.

9. The printer according to claim 1, wherein the support frame is made of metal and has a higher rigidity than the cover member.

10. The printer according to claim 1, further comprising a third cover member pivotably movably supported by the cover member and configured to be fitted in the surrounding part, the third cover member having a peripheral portion configured to face the peripheral portion of the surrounding part to constitute another part of the discharge slot when fitted in the surrounding part.

11. The printer according to claim 10, further comprising a platen roller rotatably supported by the support frame, wherein the third cover member is configured to cover the platen roller when fitted in the surrounding part.

12. A printer comprising:

a print head configured to perform printing on a medium;

a support frame elongated in a first direction and supporting the print head, the support frame comprising a frame engagement portion;

a discharge slot elongated in the first direction, the medium being configured to be discharged through the discharge slot after the printing is performed on the medium by the print head; and a cover member elongated in the first direction and covering the print head and the support frame, the cover member comprising:

a surrounding part elongated in the first direction and surrounding an entirety of the discharge slot, the surrounding part having a peripheral portion extending in the first direction and constituting a part of the discharge slot; and a first engagement portion engaged with the frame engagement portion, wherein the cover member comprises a first portion and a second portion integral with each other, wherein the surrounding part is provided to span across the first portion and the second portion, and wherein the first engagement portion is provided at the first portion.

* * * * *